3,174,898
FUNGICIDAL SOIL TREATMENT
Yukiyoshi Takahi, Hiroji Sumi, and Shoji Kamimura, Yasu-cho, Yasu-gun, Japan, assignors to Sankyo Company, Limited, Tokyo, Japan
No Drawing. Filed July 18, 1961, Ser. No. 124,778
2 Claims. (Cl. 167—30)

This invention relates to fungicidal compositions for the treatment of soil. More particularly, it relates to fungicidal compositions suitable for the treatment of soil containing as an active ingredient a phenylethynyl mercury compound having the general formula

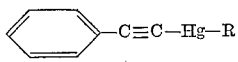
(I)

wherein R represents a lower alkyl radical containing 1-3 carbon atoms, which are useful for controlling soil-born diseases.

Control of soil-born disease would be achieved by sterilizing pathogens in soil, which achievement was very difficult in practice by reasons as mentioned below.

A number of organic mercury compounds have been used in a variety of agricultural sterilizing agents because of their high fungicidal activities, but, if applied in soil, their activities are not remarkably high. For example, use of ethylmercury phosphate, ethylmercury chloride, methoxyethylmercury chloride or phenylmercury acetate as an active ingredient in fungicidal compositions for treating soil has been proposed. However, these compounds, as known, are dissociated into ions in aqueous solutions and as the ionizable mercury compound is easily adsorbed on soil due to ion-exchange phenomenon of soil, their fungicidal activities in deep soil are reduced because of their incapability to penetrate into deep soil.

It is therefore impossible to achieve sterilization of deep-soil pathogens with these mercury compounds when applied to soil in the form of aqueous solutions or in the form of dusts or granules, because they are adsorbed only on the upper layer of the soil.

It is an object of this invention to provide fungicidal compositions suitable for soil sterilization which are adsorbed on soil to a very small extent, penetrate deeply into soil and exert adequate vapor actions. Other objects of this invention will be apparent from the following detailed description.

As a result of studies for overcoming the above-mentioned disadvantages, we have found that the compounds of the aforementioned general Formula I are adsorbed on soil to a very small extent, penetrate deeply into soil and have adequate fungicidal vapor action to produce remarkable effects for controlling soil-born diseases. The mercury compounds involved in the aforementioned general Formula I show almost no ionizable phenomenon owing to direct combination of the two carbon atoms to the mercury atom and undergo no ion-exchange reaction in soil so that they may penetrate into deep soil. Accordingly, on applying to soil in the aqueous solution the concentration of the mercury compound of the present invention is not almost decreased with the result that the effective dose expands widely in the soil to exert sufficient fungicidal activity.

The mercury compounds used in the compositions according to the present invention may be obtained by reacting lithium or sodium with phenylacetylene to give the acetylide and then reacting the latter with alkyl mercury chlorides. The latter reaction may be represented chemically by the following equation:

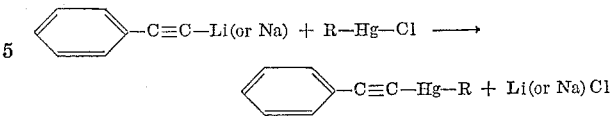

wherein R has the same meaning as above.

The above-mentioned reaction may be preferably effected by adding alkyl mercury chlorides to a suspension or solution of the acetylide in an inert solvent such as ether, benzene or liquid ammonia.

The fungicidal compositions for soil sterilization according to this invention may be employed in various forms including liquids, dusts and granules.

The mercury compounds may be modified with one or more of a plurality of additaments or soil treating adjuvants, including water or inert organic solvents, surface active dispersing agents or inert solids. Depending upon the concentration of toxicant, such augmented compositions are adapted to be distributed in the soil, or employed as concentrates and subsequently diluted with additional inert carrier to produce the ultimate treating compositions. The exact concentration of the mercury compounds to be employed in compositions for the treatment of the plant growth media is not critical and may vary provided the required dosage of effective agent is supplied in the soil.

The concentration of toxicant in organic solvent compositions employed to supply the desired dosage is generally from about 0.1 to 30 percent by weight. With aqueous compositions, the required dosage is generally supplied with compositions containing 0.001 to 10 percent by weight, although concentrations of 0.0001 to 0.01 percent by weight conveniently may be employed in irrigation treatment of soil.

In dust and granules, the concentrations of toxicant may be from 0.01 to 10 percent by weight.

Liquid compositions containing the desired amount of the mercury compounds may be prepared by dissolving the toxicant compounds in an organic liquid such as acetone, toluene, xylene, chlorobenzene and petroleum distillates, or by dispersing the compounds in water with the aid of a suitable surface active dispersing agent such as an ionic or non-ionic emulsifying agent.

The preferred organic solvent carriers are those which are adapted to accomplish the penetration and impregnation of the soil with the mercury compounds.

The aqueous compositions may contain one or more water-immiscible solvents for the mercury compounds. In such compositions the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the mercury compounds in the aqueous carrier to produce the desired composition. The surface-active dispersing agents are generally employed in the amount of from 0.5 to 20 percent by weight based upon the weight of the active mercury compound in the composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols and the like.

In the preparation of dust and granule compositions, the mercury compounds are dispersed in and on an inert solid such as talc, pyrophyllite, kieselguhr, Attaclay, diatomaceous earth, vermiculite and the like. In such operations, the carrier is mechanically ground with the compounds or wet with a volatile organic solvent solution thereof. Similarly, dust compositions containing the mercury compounds may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface-active dispersing agents or with talc, chalk or gysum and the like to obtain the desired amount of active ingredient in a composition adapted to be employed for the treatment of the soil. Also such concentrate dust compositions may be dispersed in water with or without the aid of a dispersing agent to form aqueous soil treating compositions.

The distribution of toxicant may be accomplished by introducing the toxicant in the water employed to irrigate the soil. In such procedure, the amount of water may be varied in accordance with the moisture content of the soil in order to obtain the desired depth of distribution of the toxicants. Other formulations comprising active ingredients of this invention together with inert carriers and/or dispersing agents are prepared by similar means and have in general make-ups similar to those given above.

The above-mentioned compositions can also be mixed with other fungicides, insecticides, nematocides or fertilizers. As an insecticide, for instance, lindane, aldrin or heptachlor can be mixed.

The following examples illustrate the invention but are not to be construed as limiting the same.

EXAMPLE 1

To lithium amide prepared from 0.65 g. of metallic lithium and 20 mg. of ferric nitrate in liquid ammonia is added a solution of 10 g. of phenylacetylene in 20 ml. of ether and the mixture is stirred for 2 hours. To the resulting mixture are added 26 g. of powdered ethylmercury chloride followed by stirring of 6–8 hours. The reaction temperature is maintained from $-35°$ C. to $-40°$ C. To the reaction mixture are added 6 g. of ammonium chloride and the mixture is stirred for a short time. The ammonia is then evaporated and the residue is treated with water and ether. The aqueous solution is extracted once with ether and the combined ether extract and solution are washed with two portions of water and dried over sodium sulfate. Evaporation of the ether gives an oily residue, 27 g., which is ethyl phenylethynylmercury, $B.P._{0.7}$ 110–120° C.

EXAMPLE 2

Use of methylmercury chloride in place of ethylmercury chloride in the above Example 1 yields methyl phenylethynylmercury, $B.P._{0.7}$ 97–105° C.

EXAMPLE 3

Use of n-propylmercury chloride in place of ethylmercury chloride in the above Example 1 yields n-propyl phenylethynylmercury, $B.P._{0.7}$ 125–134° C.

EXAMPLE 4

Use of iso-propylmercury chloride in place of ethylmercury chloride in the above Example 1 yields iso-propyl phenylethynylmercury, $B.P._{0.7}$ 121–130° C.

EXAMPLE 5

In this example the toxic agents of the present invention were tested for fungicidal actions on spores of *Fusarium oxysporum, Gibberella zeae, Corticium sasakii, Corticium solani* and *Agrobacterium tumefaciens*. In carrying out this test, the organisms referred to above were cultured on potato-sucrose agar (pH 7.0) at the temperature of 28 to 30° C. Methyl phenylethynylmercury, ethyl phenylethynylmercury, n-propyl phenylethynylmercury and iso-propyl phenylethynylmercury were respectively dispersed in water with the aid of surface-active dispersing agent. The suspension of spores was mixed with the above toxic solution and kept for a period of 60 hours. At the end of this time, the spores were examined under the microscope for germination. The results of these tests are presented in the following table.

*Antipathogenic action of mercury compounds; effective concentration in p.p.m.*

| | Fusarium oxysporum | Gibberella zeae | Corticium sasakii | Corticium solani | Agrobacterium tumefaciens |
|---|---|---|---|---|---|
| Methyl phenylethynyl-mercury | 1 | 1–3 | 1–3 | 1 | 3 |
| Ethyl phenylethynyl-mercury | 1 | 1 | 0.3 | 1 | 1 |
| n-Propyl phenylethynyl-mercury | 1–3 | 1 | 1 | 1 | 3 |
| Iso-propyl phenylethynyl-mercury | 3 | 1 | 1 | 3 | 3 |

EXAMPLE 6

4 parts by weight of ethyl phenylethynylmercury, 20 parts by weight of Newcol 565 (manufactured by Nihon Emulsifier Co., Ltd.) and 76 parts by weight of xylene are mixed to obtain a liquid. The results of test on penetrative activity in comparison with a liquid containing as the active ingredient phenylmercury acetate were as follows: 25 ml. of the liquid equivalent to 50 p.p.m. of Hg were poured into a glass cylinder, 3 cm. in diameter and 20 cm. in length, packed with 100 g. of dried soil. The soil was divided into layers after 1 and 5 days and fungicidal activity of each layer was examined to give the results as below.

*Index of mycelial growth*

| Compound | Depth of soil layer | | | | Days after |
|---|---|---|---|---|---|
| | 1–4 cm. | 5–8 cm. | 9–12 cm. | 13–16 cm. | |
| Ethyl phenylethynyl-mercury | 0 | 0 | 0 | 0 | 1 |
| Phenyl-mercury acetate | 0 | 2.0 | 10.0 | 24.0 | 1 |
| Untreated | 100 | | | | |
| Ethyl phenylethynyl-mercury | 0 | 0 | 0 | 7.0 | 5 |
| Phenyl-mercury acetate | 0 | 48.0 | 47.0 | 48.0 | 5 |
| Untreated | 100 | | | | |

The results of phytotoxicity test in cucumber and tomato on the above-described liquid were given below.

| Compound | Concentration in terms of Hg, p.p.m. | Phytotoxicity | |
|---|---|---|---|
| | | Cucumber | Tomato |
| Ethyl phenylethynyl-mercury | 100 | +++ | +++ |
| | 50 | ± | ± |
| | 25 | – | – |
| Untreated | | – | – |

(+++) Large phytotoxicity.
(±) Little phytotoxicity.
(–) No phytotoxicity.

Test was made on the effect of above-mentioned liquid for controlling damping-off cowpea caused by *Corticium solani* in comparison with that of liquid containing as the active ingredient ethylmercury phosphate with the results given below.

One-week culture of *Corticium solani* was placed in soil in a depth of 3 cm. and the agent in various concentrations was uniformly poured on the surface of soil in an amount of 9 liters per 3.3 m.², followed by seeding of cowpea.

| Compound | Concentration in terms of Hg in p.p.m. | No. of plant investigated | No. of plant diseased | Percent diseased | Phytotoxicity |
|---|---|---|---|---|---|
| Ethyl phenylethynylmercury | 5 | 17 | 8 | 47.1 | — |
|  | 10 | 20 | 2 | 10.1 | — |
|  | 20 | 20 | 0 | 0 | — |
| Ethyl mercury phosphate | 5 | 18 | 8 | 44.4 | — |
|  | 10 | 18 | 8 | 44.4 | — |
|  | 20 | 18 | 7 | 38.9 | — |
| Control |  | 20 | 19 | 95.0 | — |

The similar results were obtained with methyl phenylethynylmercury, n-propyl phenylethynylmercury and iso-propyl phenylethynylmercury.

EXAMPLE 7

2 parts by weight of methyl phenylethynylmercury and 98 parts by weight of clay are pulverized and mixed to give a dust. The preparation may be applied directly to soil or as a seed dressing.

EXAMPLE 8

A solution of iso-propyl phenylethynylmercury in ether is adsorbed on vermiculite in a ratio of 5 parts by weight of the former to 95 parts by weight of the latter to produce a granule. Size of the granule is suitably 20–50 mesh. The preparation may be applied in a similar way as in Example 7.

We claim:

1. A method of inhibiting fungicidal growth in soil which comprises applying to said soil an effective amount of ethyl phenylethynyl mercury.

2. A method of inhibiting fungicidal growth in soil which comprises applying to said soil an effective amount of a composition comprising as an active ingredient ethyl phenylethynyl mercury, and further containing a soil treating adjuvant therefor.

References Cited by the Examiner

FOREIGN PATENTS 721,172   5/42   Germany.
15,864   10/60   Japan.

JULIAN S. LEVITT, *Primary Examiner.*

MORRIS O. WOLK, LEWIS GOTTS, *Examiners.*